Nov. 22, 1960
F. M. SCHNEIDER
2,960,799
TRANSPLANTING POT
Filed Sept. 24, 1957
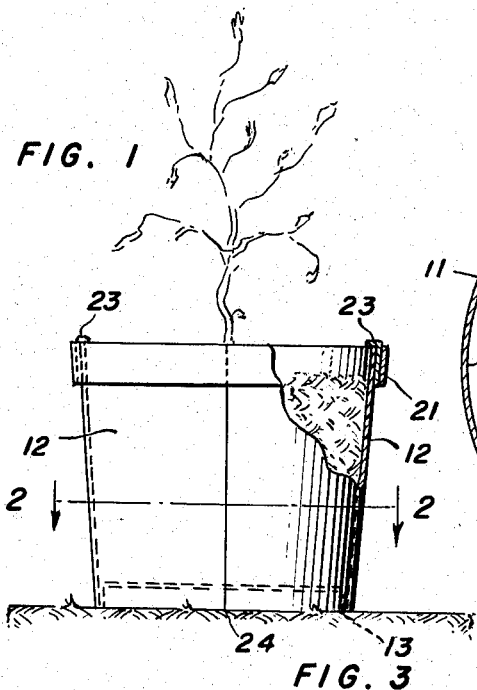
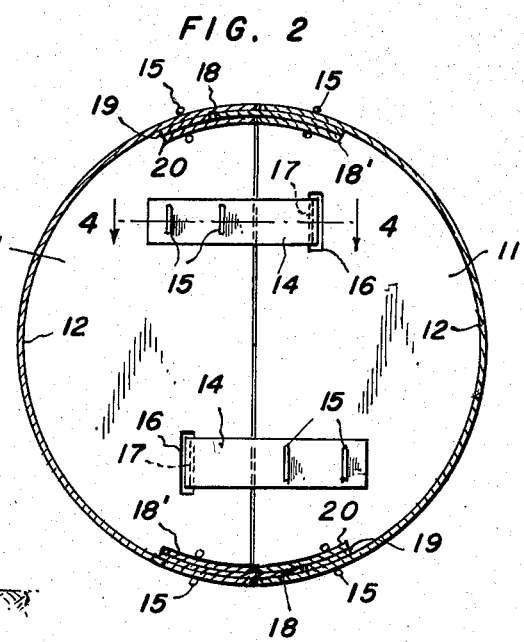
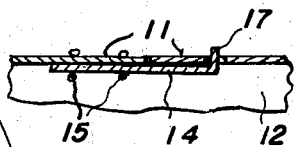
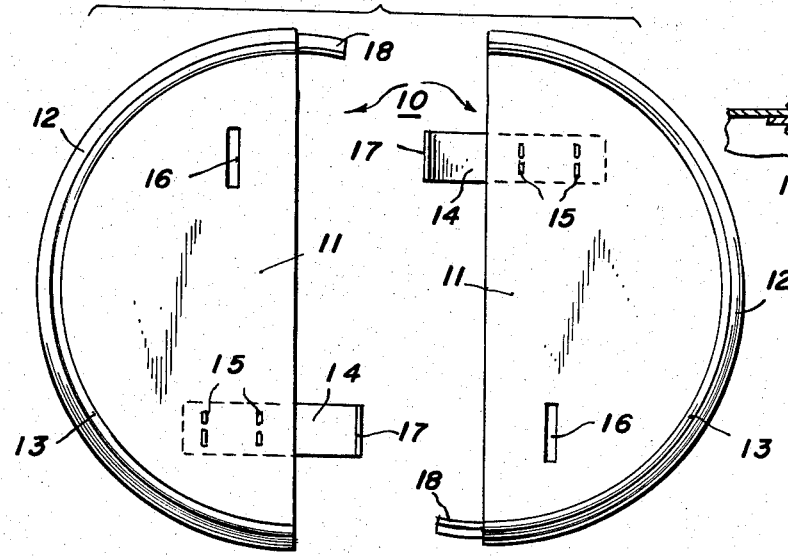
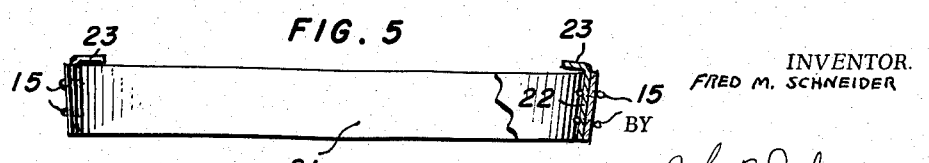
INVENTOR.
FRED M. SCHNEIDER
BY
John B. Dickman 3rd
AGENT

United States Patent Office 2,960,799
Patented Nov. 22, 1960

2,960,799

TRANSPLANTING POT

Fred M. Schneider, 2431 Struble Road,
Cincinnati, Ohio

Filed Sept. 24, 1957, Ser. No. 685,911

1 Claim. (Cl. 47—37)

This invention relates to expendable pots for use by nurseries and private gardeners in handling plants so that they may be easily transplanted into the garden plot or a larger pot without disturbing their root growth in the process.

The object of this invention is to construct a stiff paper or plastic pot in two parts which can be readily assembled for use in raising plants, and which can be instantly and easily disassembled in the process of transplanting its plant into the garden or into another larger pot, without disturbing the sod around the roots.

Another object is to make the above pot in two halves split vertically, each half having similar tab extensions and complementary slits over which the bent ends of the corresponding extensions may be hooked to hold the bottom of the two halves together when they are assembled to form the pot.

A further object is to provide an outer rim band of similar material for wedging over the outside of the halves to hold their upper rims together, and to provide a flap extension along one side edge of each half and a receiving slot along its other side edge, so that on assembly of two halves, their flaps and corresponding slots will form guide means to bring the corresponding side edges together in a firm joint of three thicknesses of the material.

A further object is to apply the tab extensions to the inside of the bottoms, so that the soil placed in the pot will prevent them from accidentally unhooking during assembled use and yet will allow them to be unhooked for disassembly, by pushing up the bent ends of the tabs up into the bottom of the pot to clear their respective slots and release the two halves of the bottom for separation.

Other and more specific objects will appear in the following detailed description of one form of the invention as illustrated in the accompanying drawing, wherein:

Fig. 1 is an elevational view of a pot made in accordance with this invention, partially broken away to show a section through the rim portion, Fig. 2 is a sectional plan view of the pot taken on the line 2—2 of Fig. 1, Fig. 3 is a bottom view of the two halves in disassembled position, Fig. 4 is a detail sectional view taken on the line 4—4 of Fig. 2, and Fig. 5 is a separate elevational view of the outer rim band partially broken away to show a section through one of the bent tabs fixed to the band for extending over the top of the rim of the pot to hold the band against slipping down out of assembled position on the pot.

While this construction is primarily intended for a one time use, there is no reason why the assembly cannot be used over and over again, with careful handling, until worn out.

The halves 10, as illustrated, are identical, each having a semi-circular bottom 11 and a semi-conical frustum side wall 12, the bottom being slightly spaced from the bottom edge 13 of the side wall.

A tab extension 14 may be fixed to the inside of the semi-circular half bottom 11 as by stapling at 15, 15, and a slit 16 formed in a complementary position in the bottom 11, so that when two halves are placed together the downwardly bent end 17 of each tab may be hooked into the slit in the other half bottom to interlock the two half bottoms into a continuous whole when the two parts of the pot are assembled.

One side edge of each wall 12 has a guide flap 18 extending therefrom, and the other side edge has a slot formed coextensive with the inside of said side wall by stapling two layers 19 and 20 of sheet material along the inside of said wall, the intermediate layer 19 being cut out to form said slot, so that when the two parts of the pot are assembled, the flaps may enter their corresponding slots to guide the two edges against each other, whereby a firm reenforced joint along the adjoining side edges is formed. Obviously, the flap 18 may be stapled with an overlying strip 18' of the sheet material to the inside of its side edge of the wall, whereby a three ply reenforced joint is formed across each split between corresponding side edges of the two parts in the assembled pot.

The outer rim band 21 is frusto-conical, and is made to snugly fit around the rim of the assembly pot, and may be slipped around the two parts from below and wedged upwardly, working it to the top of the side walls to form a reenforeced rim for the pot while holding the parts firmly together. The band 21 may be provided with retaining strips or tabs 22 stapled to the inside of the band and having bent upper ends 23 for hooking over the upper edge of the side walls 12, upon final assembly of the pot, to prevent the band from working down during use and loosening the assembly, although normally, with a small conical taper angle, enough friction is obtained between the band and the side walls to prevent the displacement of the band after it is pushed up to wedge the two side walls together without requiring any retaining means.

All the parts except, of course, the staples, may be made and cut out of the same sheet material, such as stiffened paper or cheap plastic compositions, which may be coated with wax or shellac to preserve them against moisture from the soil placed in the pots and to add to their stiffness and durability.

Thus, the parts for this assembly may be cheaply made in mass production machines, and with proper care, may be used over and over again before discarding.

The bottom of the side wall 12 may have its edge 24 folded over the inside of a downwardly presssed flange around the circular edge of the semi-circular bottom 11, the parts being held together by adhesion of the coating material used.

Many obvious modifications in the form and disposition of the parts may be made without departing from the spirit and scope of the present invention, as defined in the appended claim.

What is claimed is:

An expendable pot for plants, having side walls and a bottom comprising an assembly of two complementary, identical halves of flexible waxed paper split vertically and having interlocking means extending the full length of the split joint, said interlocking means comprising a strip of waxed paper attached to and spaced from one side of each half adjacent the joint and forming a groove therebetween, said strip extending substantially outwardly from and parallel to the side wall of said pot, a second strip of waxed paper in close engagement with the other side of each half forming a tongue thereon and extending substantially outwardly therefrom and parallel to the side wall of said pot, a tab having a downwardly bent portion and a slit on each bottom half whereby when the two halves are assembled and the pot filled with earth, the tongue on each half will engage the groove on the other half and form a unitary structure, and said bent portions on said tabs on said bottom halves will engage said slits and be held in position by said earth filling.

References Cited in the file of this patent

UNITED STATES PATENTS

| | | |
|---|---|---|
| 223,093 | Barnhill et al. | Dec. 30, 1879 |
| 632,321 | Olney | Sept. 5, 1899 |
| 637,763 | Burke | Nov. 28, 1899 |
| 1,774,019 | Lam | Aug. 26, 1930 |
| 2,594,307 | Valenzuela | Apr. 29, 1952 |

FOREIGN PATENTS

| | | |
|---|---|---|
| 371,441 | Great Britain | Apr. 25, 1932 |